United States Patent [19]

Takamura et al.

[11] Patent Number: 4,667,280

[45] Date of Patent: May 19, 1987

[54] VOLTAGE MULTIPLYING RECTIFIER

[75] Inventors: Yoshio Takamura, Yokohama; Akira Nakajima, Yokosuka, both of Japan

[73] Assignee: Kabushiki Kaisha Toshiba, Tokyo, Japan

[21] Appl. No.: 664,853

[22] Filed: Oct. 25, 1984

[30] Foreign Application Priority Data

Dec. 16, 1983 [JP] Japan .................................. 58-237353

[51] Int. Cl.$^4$ ............................................. H02M 3/18
[52] U.S. Cl. ...................................... 363/61; 307/110
[58] Field of Search ..................... 363/59, 60, 61, 126; 320/1; 307/110

[56] References Cited

U.S. PATENT DOCUMENTS 2,619,602 11/1952 Walker et al. .......................... 363/59
4,437,147 3/1984 Takamura et al. ..................... 363/61

FOREIGN PATENT DOCUMENTS 56-62069 5/1981 Japan .
491526 7/1970 Switzerland .
645630 4/1948 United Kingdom .
843736 8/1960 United Kingdom .

OTHER PUBLICATIONS

"Handbook of Rectifier Circuits", published by Ellis Horwood, Co., Ltd. in 1980, pp. 158-168.

Primary Examiner—Peter S. Wong
Assistant Examiner—Judson H. Jones
Attorney, Agent, or Firm—Finnegan, Henderson, Farabow, Garrett & Dunner

[57] ABSTRACT

A step-up rectifier circuit includes first and second input terminals for applying AC outputs of opposite polarities, a third input terminal connected between the first and second input terminals, a plurality of rectifier elements connected between the third input terminal and a first output terminal, a plurality of output capacitors connected in parallel to the rectifier elements, a second output terminal connected to a node between said output capacitors, a plurality of first capacitors connected between nodes between those of said rectifying elements located between the first output terminal and the second output terminal and a plurality of second capacitors connected between nodes between those of the rectifying elements which are between the second output terminal and the third input terminal, wherein the capacitance of the capacitors is defined such that the output voltages at individual output terminals can be made constant, regardless of whether other output terminals are loaded or unloaded.

2 Claims, 3 Drawing Figures

VOLTAGE MULTIPLYING RECTIFIER

BACKGROUND OF THE INVENTION

The present invention relates to a step-up rectifier circuit and, as disclosed herein, to a step-up rectifier circuit which multiplies the input voltage and can generate different output voltages and currents at a plurality of output terminals, by using a plurality of diodes and a plurality of capacitors.

DESCRIPTION OF THE PRIOR ART

As is well-known in the art, a step-up rectifier circuit constructed with a plurality of diodes and capacitors usually has a high internal impedance. As a result, the step-up rectifier circuit has the defect that the output voltage varies widely with changes in load. When an output voltage is provided from an intermediate portion of the rectifier circuit, it has a very strong influence upon the voltage at another output terminal, so that it is difficult to keep the voltages at each output terminal at a constant level when the load condition varies at other terminals.

SUMMARY OF THE INVENTION

An object of this invention is, therefore, to provide a step-up rectifier circuit in which the output voltages at individual output terminals can be made constant, regardless of the load conditions.

Another object of this invention is to provide a step-up rectifier which can provide output voltages and currents at each of a plurality of output terminals without causing a change in the output voltages and currents at the other terminals.

Additional objects and advantages of the invention will be set forth in part in the description which follows, and in part will be obvious from the description, or may be learned from the practice of the invention. The objects and advantages may be realized and attained by means of the instrumentalities and combinations particularly pointed out in the appended claims.

In order to achieve the objects of the present invention as embodied and broadly disclosed herein, a step-up rectifier circuit is provided for multiplying input voltage applied to said rectifier circuit, comprising first and second input terminals for supplying AC inputs of opposite polarities, a third input terminal connected between said first and second input terminals, rectifier means provided with a plurality of rectifying elements connected in series with said third input terminal and aligned in the same direction of rectification, a plurality of series-connected output capacitors having one end connected to said third input terminal, and connected in parallel to said plurality of rectifying elements, a first output terminal connected to the other end of said series-connected output capacitors, a second output terminal connected to a node between said output capacitors, a plurality of first capacitors connected between said first and second input terminals and nodes formed between those rectifying elements located between said first output terminal and said second output terminal, and a plurality of second capacitors connected between said first and second input terminals and nodes formed between those rectifying elements located between said second output terminal and said third input terminal, wherein each capacitance (Ca) in farads of said first capacitors is defined by the following equation:

$$Ca = I_1(\tfrac{2}{3}n_1^3 - n_1^2 + \tfrac{1}{3}n_1)/f(2n_1E_o - E_1)$$

in which $I_1$ designates the current in amperes flowing through the first output terminal; $n_1$ designates one-half of the number of said first capacitors; f designates the frequency in Hertz of said power supply; $E_0$ designates the voltage in volts between said first and second input terminals; $E_1$ designates output voltage in volts between first and second output terminals.

The accompanying drawings, which are incorporated in and constitute a part of the specification, illustrate several embodiments of the invention, and together with the description, serve to explain the principles of the invention.

DESCRIPTION OF THE PREFERRED EMBODIMENTS

The present invention will be described in connection with two embodiments thereof, and with reference to the accompanying drawings.

Figure 1:
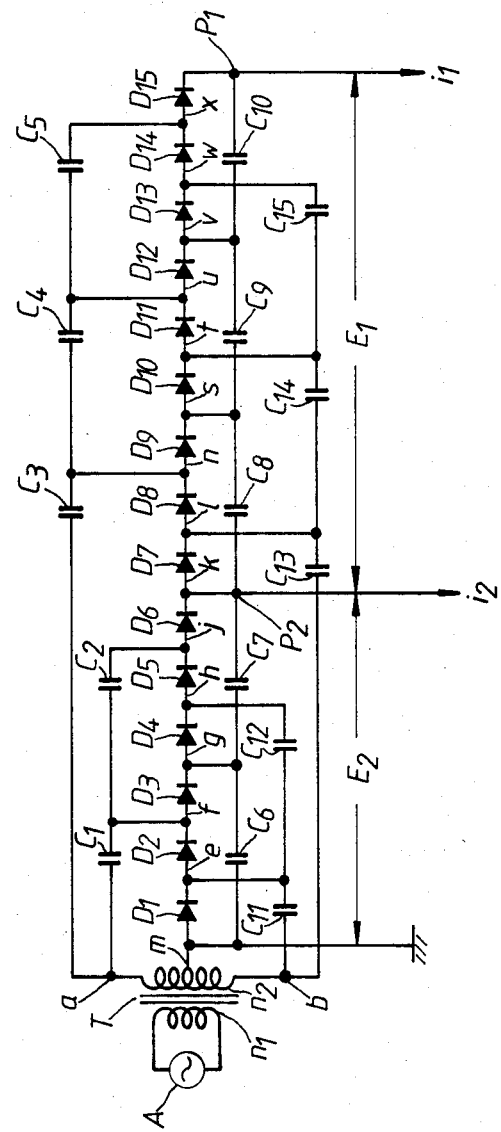
FIG. 1 is a circuit diagram of one embodiment of the step-up rectifier circuit constructed according to the present invention.

In FIG. 1, AC power supply A is connected to the primary winding $n_1$ of a transformer T. The secondary winding $n_2$ of this transformer T is provided with a middle tap m. Two terminals a, b of the secondary winding $n_2$ and the middle tap m of the transformer provide first to third input terminals, so that AC inputs of opposite polarities are supplied to the two terminals a, b of the secondary winding $n_2$. The tap m, acting as the third input terminal, is grounded. A plurality of diodes $D_1$ to $D_{15}$ are connected in series between the tap m and a first output terminal $P_1$ so that their rectification directions are identical. More specifically, the anode of diode $D_1$ is connected to the tap m, and the cathode of diode $D_{15}$ is connected to the first output terminal $P_1$.

A plurality of capacitors $C_1$ to $C_5$ are connected between one side a of the secondary winding $n_2$ of the transformer T acting as the first input terminal and predetermined nodes of the diodes $D_1$ to $D_{15}$. More specifically, the capacitors $C_1$ and $C_2$ are connected in series between one side a of the secondary winding $n_2$ and the node j between diodes $D_5$ and $D_6$; and a node between the capacitors $C_1$ and $C_2$ is connected to the node f between diodes $D_2$ and $D_3$. The capacitors $C_3$, $C_4$ and $C_5$ are connected in series between one side a of the secondary winding $n_2$ and the node x between diodes $D_{14}$ and $D_{15}$. The node between capacitors $C_3$ and $C_4$ is connected to the node n between diodes $D_8$ and $D_9$, and the node between capacitors $C_4$ and $C_5$ is connected to the node u between diodes $D_{11}$ and $D_{12}$.

Five output capacitors $C_6$ to $C_{10}$ are connected between the anode of diode $D_1$ and the cathode of diode $D_{15}$. As shown, the node between capacitors $C_6$ and $C_7$ is connected to the node g between diodes $D_3$ and $D_4$, and the node between capacitors $C_7$ and $C_8$ is connected to the node k between diodes $D_6$ and $D_7$. The node between capacitors $C_8$ and $C_9$ is connected to the node s between diodes $D_9$ and $D_{10}$, and the node between capacitors $C_9$ and $C_{10}$ is connected to the node v between diodes $D_{12}$ and $D_{13}$.

A plurality of capacitors $C_{11}$ to $C_{15}$ are connected between the other side b of the secondary winding $n_2$ of the transformer T, which acts as a second input terminal, and predetermined nodes between diodes $D_1$ to $D_{15}$. More specifically, capacitors $C_{11}$ and $C_{12}$ are connected in series between the other side b of the secondary winding $n_2$ and the node h between diodes $D_4$ and $D_5$. The node between these capacitors $C_{11}$ and $C_{12}$ is connected to the node e between diodes $D_1$ and $D_2$. The capacitors $C_{13}$, $C_{14}$ and $C_{15}$ are connected in series between the other side b of the secondary winding $n_2$ and the node w between diodes $D_{13}$ and $D_{14}$. Of these, the node between capacitors $C_{13}$ and $C_{14}$ is connected to the node 1 between diodes $D_7$ and $D_8$, and the node between capacitors $C_{14}$ and $C_{15}$ is connected to the node t between diodes $D_{10}$ and $D_{11}$.

To provide a general explanation, the following designations are made for the construction described above. The current output from the first output terminal $P_1$ is designated by $i_1$ (A); the current output from a node $P_2$ (which will be referred to as the "second output terminal $P_2$") between capacitors $C_7$ and $C_8$ is designated by $i_2$ (A); the number of circuit steps between the grounded portion and the second output terminal $P_2$ (i.e., one-half of the number of capacitors connected between the nodes between rectifying elements located between the tap m and the second output terminal $P_2$ and the first input terminal a and the second input terminal b) is designated by $N_2$, wherein $N_2=2$ in FIG. 1; the number of steps between the output terminal $P_2$ and the output terminal $P_1$ (i.e., one-half of the number of capacitors connected between the nodes between the rectifying elements located between the output terminal $P_2$ and $P_1$ and the first and second input terminal a and b) is designated by $N_1$, wherein $N_1=3$ in FIG. 1; the voltage between the grounded portion and the output terminal $P_2$ is designated by $E_2$ (V); the voltage between the output terminal $P_2$ and the output terminal $P_1$ is designated by $E_1$ (V); the secondary voltage of the transformer T is designated by $E_O(V)$; and the frequency of the power supply is designated by $F(=1/T)$ (HZ). The capacitances of the capacitors $C_1$, $C_2$, $C_6$, $C_7$, $C_{11}$ and $C_{12}$, constituting the circuit from the grounded portion to the output terminal $P_2$, are designated by $C_b$ (F), and the capacitances of the capacitors $C_3$ to $C_5$, $C_8$ to $C_{10}$ and $C_{13}$ to $C_{15}$, constituting the circuit from the output terminal $P_2$ to the output terminal $P_1$, are designated by $C_a$ (F).

Where capacitors $C_3$–$C_5$ or $C_{13}$–$C_{15}$ are connected in parallel to capacitors $C_1$, $C_2$ or $C_{11}$, $C_{12}$, if this circuit is operated with a full output but zero current, i.e., under no load, the voltages $E_1$ and $E_2$ are expressed by the following equations:

$$E_1 = 2N_1 E_o \quad (1)$$

$$E_2 = 2N_2 E_o \quad (2)$$

Before the steps of deducing the above equation are explained, the operation of the circuit of FIG. 1 will be described.

First, assume side a of secondary winding $n_2$ is at a voltage of $E_o/2$ with respect to ground potential. In this case, diode $D_1$ is turned on so that capacitor $C_{11}$ is charged to a voltage $E_o/2$, in the direction such that its node e becomes positive, by a current which flows through node m, diode $D_1$, node e, capacitor $C_{11}$ and the output terminal b. Next, side b of the secondary winding $n_2$ is at a voltage of $E_o/2$, with respect to ground potential. In this case, diode $D_2$ is turned on so that capacitor $C_1$ is charged to a voltage $3/2E_o$ which is the sum of the output voltage $E_o$ of the secondary winding and the charged voltage $E_o/2$, in the direction such that node f becomes positive, by a current which flows through the output terminal b, capacitor $C_{11}$, node e, diode $D_2$, node f, capacitor $C_1$ and terminal a.

Next, the output terminal a of the secondary winding is at a voltage of $E_o/2$. In this case, diode $D_3$ is turned on so that capacitor $C_6$ is charged to a voltage of $2E_o$ which is the sum of the output voltage $E_o/2$ between the terminal a and node m of secondary winding and the charged $3/2E_o$ of capacitor $C_1$, in the direction such that node g becomes positive, by a current which flows through the output terminal a, capacitor $C_1$, node f, diode $D_3$, capacitor $C_6$ and node m. At the same time when the diode $D_3$ is turned on, the diode $D_4$ is turned on so that capacitor $C_{12}$ is charged to a voltage of $2E_o$ which is the sum of the output voltage $E_o$ of the secondary winding, the charge $3/2E_o$ of capacitor $C_1$ and the charged $-E_o/2$ (a charge direction which is the reverse of that at the capacitor $C_{12}$) of capacitor $C_{11}$, in the direction such that node h becomes positive, by a current which flows through node m, terminal a, capacitor $C_1$, diode $D_3$, diode $D_4$, capacitor $C_{12}$, capacitor $C_{11}$ and the terminal b.

Next, the output terminal b of the secondary winding is at a voltage of $E_o/2$. In this case, the diode $D_5$ is turned on so that capacitor $C_2$ is charged to a voltage of $2E_o$ which is the sum of the output voltage $E_o$ of the secondary winding, the charged voltage $E_o/2$ of capacitor $C_{11}$, the charged voltage of $2E_o$ of capacitor $C_{12}$ and the charged voltage $-3/2E_o$ of capacitor $C_1$, in the direction such that node j is positive, by a current which flows through the secondary winding $n_2$, capacitor $C_{11}$, capacitor $C_{12}$, diode $D_5$, capacitor $C_2$, and capacitor $C_1$. Next, the output terminal a of the secondary winding is at a voltage of $E_o/2$. In this case, the diode $D_6$ is turned on so that capacitor $C_7$ is charged to a voltage of $2E_o$ which is the sum of the output voltage $E_o/2$ between the terminal a and node m of secondary winding $n_2$, the charged voltage $3/2E_o$ of capacitor $C_1$, the charged voltage $2E_o$ of capacitor $C_2$ and the charged voltage $-2E_o$ of capacitor $C_6$, in the direction such that node k becomes positive, by a current which flows through terminal a, capacitor $C_1$, capacitor $C_2$, diode $D_6$, capacitor $C_7$, capacitor $C_6$ and node m.

At the same time the diode $D_7$ is turned on so that capacitor $C_{13}$ is charged to a voltage of $9/2E_o$ which is the sum of the output voltage $E_o$ of secondary winding $n_2$, the charge voltages $3/2E_o$ of capacitor $C_1$ and the charged voltage $2E_o$ of capacitor $C_2$, in the direction such that node 1 becomes positive, by a current which flows through the secondary winding $n_2$, capacitors $C_1$, $C_2$, diode $D_6$, $D_7$, and capacitor $C_{13}$.

Next, the terminal b of the secondary winding $n_2$ is at a voltage of $E_o/2$. In this case, diode $D_8$ is turned on so that capacitor $C_3$ is charged to a voltage of $11/2E_o$ which is the sum of the output voltage $E_o$ of the secondary winding $n_2$ and the charged voltage $9/2E_o$ of capacitor $C_{13}$, in the direction such that node n becomes positive, by a current which flows through the secondary winding $n_2$, capacitor $C_{13}$, diode $D_8$ and capacitor $C_3$. Next, the terminal a of the secondary winding is at a voltage of Eo/2. In this case, diode $D_9$ is turned on so that capacitor $C_8$ is charged to a voltage of 2Eo which is the sum of the output voltage Eo/2 between the terminal a and node m, the charged voltage 11/2Eo of capacitor $C_3$ and the charged voltage $-2Eo$, $-2Eo$ of capacitor $C_7$ and $C_6$, respectively, in the direction such that node s becomes positive, by a current which flows through node m, terminal a, capacitor $C_3$, diode $D_9$ and capacitors $C_8$, $C_7$, $C_6$.

At the same time, diode $D_{10}$ is turned on. In this case, capacitor $C_{14}$ is charged to a voltage of 2Eo which is the sum of the output voltage Eo of the secondary winding $n_2$, the charged voltage 11/2Eo of capacitor $C_3$ and the charged voltage $-9/2Eo$ of capacitor $C_{13}$, in the direction so that node t becomes positive, by a current which flows through the secondary winding $n_2$, capacitor $C_3$, diodes $D_9$, $D_{10}$, and capacitors $C_{14}$, $C_{13}$.

Next, the terminal b of the secondary winding $n_2$ is at a voltage Eo/2. In this case, the diode $D_{11}$ is turned on so that a capacitor $C_4$ is charged to a voltage of 2Eo which is the sum of the voltage Eo of the secondary winding $n_2$, charged voltages 9/2Eo, 2Eo of capacitors $C_{13}$, $C_{14}$, and the charged voltages $-11/2Eo$ of capacitor $C_3$, in the direction such that node u becomes positive, by a current which flows through the secondary winding $n_2$, capacitors $C_{13}$, $C_{14}$, diode $D_{11}$, and capacitors $C_4$, $C_3$.

Next, the terminal a is positive. In this case, diode $D_{12}$ and diode $D_{13}$ are turned on. As a result, capacitor $C_9$ is charged to a voltage 2Eo which is the sum of the output voltage Eo/2 between the terminal a and node m, the charged voltages 11/2Eo, 2Eo of capacitors $C_3$, $C_4$ and the charged voltages $-2Eo$, $-2Eo$, $-2Eo$ of capacitors $C_8$, $C_7$, $C_6$, in the direction such that node v becomes positive, by a current which flows through node m, terminal a, capacitors $C_3$, $C_4$, diode $D_{12}$, capacitors $C_9$, $C_8$, $C_7$, $C_6$. At the same time, capacitor $C_{15}$ is charged to a voltage 2Eo which is the sum of the voltage Eo of the secondary winding $n_2$, the charged voltages 11/2Eo, 2Eo of capacitors $C_3$, $C_4$ and the charged voltages $-2Eo$, $-9/2Eo$ of capacitor $C_{14}$, $C_{13}$, in the direction such that node w is positive, by a current which flows through the secondary windings $n_2$, capacitors $C_3$, $C_4$, diodes $D_{12}$, $D_{13}$ and capacitors $C_{15}$, $C_{14}$, $C_{13}$.

Next, the terminal b of the secondary winding is positive. In this case, diode $D_{14}$ is turned on so that capacitor $C_5$ is charged to a voltage 2Eo which is the sum of the output voltage $E_o$ of the secondary winding $n_2$, the charged voltage 9/2$E_o$, 2$E_o$, 2$E_o$ of capacitors $C_{13}$, $C_{14}$, $C_{15}$ and the charged voltage $-2Eo$, $-11/2E_o$ of capacitors $C_4$, $C_3$, in the direction such that node x is positive, by a current which flows through the secondary winding $n_2$, capacitors $C_{13}$, $C_{14}$, $C_{15}$, diode $D_{14}$ and capacitors $C_5$, $C_4$, $C_3$. Next, the terminal a is positive. In this case, the diode $D_{15}$ is turned on so that capacitor $C_{10}$ is charged to a voltage 2$E_o$ which is the sum of the output voltage Eo/2 between terminal a and node m, the charged voltages 11/2$E_o$, 2$E_o$, 2$E_o$ of capacitors $C_3$, $C_4$, $C_5$ and the charged voltages $-2E_o$, $-2E_o$, $-2E_o$, $-2E_o$ of capacitors $C_9$, $C_8$, $C_7$, $C_6$, in the direction such that the output terminal is positive, by a current which flows through node m, terminal a, capacitors $C_3$, $C_4$, $C_5$, diode $D_{15}$ and capacitors $C_{10}$, $C_9$, $C_8$, $C_7$, $C_6$.

As described above, each of the output capacitors $C_6$ to $C_{10}$ is charged to voltage 2$E_o$ which is twice the output voltage $E_o$ of the secondary winding $n_2$. The voltages $E_1$ and $E_2$ are obtained by summing the voltages on the capacitors $C_6$ and $C_7$ for voltage $E_2$ to capacitors $C_8$ and $C_{10}$ for voltage $E_1$. Thus, the voltages obtained are as expressed in equations (1) and (2) above.

The equations (1) and (2) are formed under no load. When load current flows from the output terminals $P_2$ and $P_1$, a voltage drop $E_d$ is established, which will now be considered with reference to FIG. 2.

Figure 2:
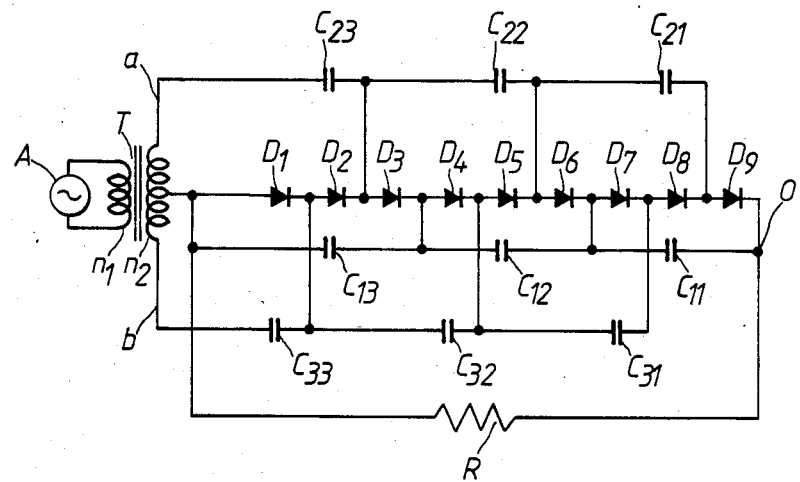
FIG. 2 is a circuit diagram used to explain the operation of the embodiment of the present invention.

In FIG. 2, the mean value of the load current flowing during one period T $(=1/f)$ is designated by I (A), and the voltage drop which occurs during one period in an output capacitor of a capacity C (F) is designated by $e_O$ (V). The capacitances of the individual capacitors are assumed to be equal.

The following conditions (a) to (c) hold for FIG. 2:

(a) A load current flows through the output capacitors $C_{11}$, $C_{12}$ and $C_{13}$ connected in series, so that each output capacitor produces an equal voltage drop $e_o$ of predetermined value.

(b) The voltage drops during one period generated in capacitors $C_{11}$, $C_{12}$ and $C_{13}$ at the instant within that period at which point a becomes positive are supplied by capacitors $C_{21}$, $C_{22}$ and $C_{23}$ (i.e., they are charged to compensate for discharges due to the current flows).

(c) The voltage drops during one period, generated in capacitors $C_{21}$, $C_{22}$ and $C_{23}$ at the instant within that period at which point b becomes positive are supplied by capacitors $C_{31}$, $C_{32}$ and $C_{33}$.

As a result, the voltage drops in the individual capacitors during one period are as follows:

$C_{11}$, $C_{12}$ and $C_{13}$: $e_O$, $C_{21}$: $e_O$, (i.e., the voltage drop due to the supply of $C_{11}$)

$C_{31}$: $e_O$, (i.e., the voltage drop due to the supply of $C_{21}$)

$C_{22}$: $2e_O$, (i.e., the voltage drop due to the supply of $C_{12}$ and $C_{31}$)

$C_{32}$: $2e_O$, (i.e., the voltage drop due to the supply of $C_{22}$)

$C_{23}$: $3e_O$, (i.e. the voltage drop due to the supply of $C_{13}$ and $C_{32}$), and $C_{33}$: $3e_O$, (i.e. the voltage drop due to the supply of $C_{23}$).

The total voltage drops in the circuit are the sums of the voltage drops in the individual capacitors occuring in one cycle and are as follows:

$C_{33}$: $3e_O$, $C_{23}$: $6e_O$, $C_{32}$: $8e_O$, $C_{22}$: $10e_O$, $C_{31}$: $11e_O$, and $C_{21}$: $12e_O$.

The output capacitor $C_{11}$ is supplied by the capacitor $C_{21}$ so that the voltage drop in the output capacitor $C_{11}$ after the current supply to the load is $12e_O$.

Similarly, output capacitors $C_{12}$ and $C_{13}$ have voltage drops of $10e_O$ and $6e_O$, respectively.

The values of the voltage drops in the output capacitors $C_{11}$, $C_{12}$ and $C_{13}$ can be broken down as follows:

$C_{11}$: $(2 \times \underline{3} + 2 \times 2 + 2 \times 1)e_O$, $C_{12}$: $(2 \times \underline{3} + 2 \times 2)e_O$, and $C_{13}$: $(2 \times \underline{3})e_O$.

In the above three equations, the underlined numerals 3 correspond to one-half of the number of capacitors $C_{21}$, $C_{22}$, $C_{23}$, $C_{31}$, $C_{32}$ and $C_{33}$ connected between points a and b and nodes between rectifying elements. Therefore, if one-half of the number of capacitors connected between point a and b and nodes between rectifying elements is generally designated by n, the voltage drops in the output voltage capacitors can be expressed by the following equations:

$$C_{11}: \{2n + 2 \times (n-1) + 2 \times (n-2)\}e_O \qquad (a),$$

$$C_{12}: \{2n + 2 \times (n-1)\}e_O \qquad (b),$$

and $$C_{13}: 2n\ e_O \quad (c).$$

The total voltage drop resulting from the flow of the load current is the sum of the voltage drops in the individual capacitors. Generally speaking, therefore, the total voltage drop $E_d$ is expressed by the following equation when there are three output capacitors:

$$E_d = \{2n \times \underline{3} + 2(n-1)\,(\underline{3}-1) + 2(n-2)\,(\underline{3}-2)\}e_O,$$

wherein the underlined numerals $\underline{3}$ designate one-half of the number of capacitors connected between point a and b and nodes between rectifying elements.

If one-half of the number of capacitors connected between point a and b and nodes between rectifying elements is designated by n, the total voltage drop in the output capacitors is expressed by the following equation when the voltage drops expressed by Equations (a), (b) and (c) are extended to the case of a number n of output capacitors:

$$E_d = \{2n^2 + 2(n-1)^2 + 2(n-2)^2 + 2(n-3)^2\}\ldots e_O.$$

This equation can be rewritten in the following form:

$$E_d = \left\{ 2 \sum_{n=1}^{n} n^2 \right\} e_o = \left( \frac{2}{3} n^3 + n^2 + \frac{1}{3} n \right) e_o \quad (3)$$

In the above equation (3), $e_O = Q/C = IT/C = 1/(C \times f)$.

As a result, the voltage drop $E_d$, when the load voltage is applied at the output, is expressed by the following equation:

$$E_d = \left( \frac{2}{3} n^3 + n^2 + \frac{1}{3} n \right) \frac{I}{Cxf}, \quad (4)$$

wherein:
n: one-half of the number of capacitors connected between the nodes between rectifying elements and points a and b,
I: load current (A),
C: capacitance of capacitors (F), and
f: frequency of input power supply (Hz).

Therefore, the voltage drop $E_{1d}$ in the voltage $E_1$ is expressed by the following equation:

$$E_{1d} = \left( \frac{2}{3} n_1^3 + n_1^2 + \frac{1}{3} n_1 \right) \frac{I_1}{Caxf}, \quad (5)$$

wherein $I_1 = i_1$.

On the other hand, the voltage drop $E_{2d}$ in the voltage $E_2$ is expressed by the following equation, because the voltage drop due to the current $i_1$ is added to the voltage drop due to the current $i_2$:

$$E_{2d} = \left( \frac{2}{3} n_2^3 + n_2^2 + \frac{1}{3} n_2 \right) \frac{I_2}{Cbxf}, \quad (6)$$

wherein $I_2 = i_1 + i_2$.

From the above, if the voltage at output terminal $P_2$ (FIG. 1) under load is designated by $E_2$, and if the voltage from output terminal $P_2$ to output terminal $P_1$ is designated $E_1$, voltages $E_1$ and $E_2$ are expressed by the following equations:

$$E_1 = 2n_1 E_o - \left( \frac{2}{3} n_1^3 + n_1^2 + \frac{1}{3} n_1 \right) \frac{I_1}{Caxf}, \quad (7)$$

and $$E_2 = 2n_2 E_o - \left( \frac{2}{3} n_2^3 + n_2^2 + \frac{1}{3} n_2 \right) \frac{I_2}{Cbxf}. \quad (8)$$

These equations (7) and (8) can be rewritten in the following form:

$$Ca = I_1 \left( \frac{2}{3} n_1^3 + n_1^2 + \frac{1}{3} n_1 \right) / f(2n_1 E_o - E_1) \quad (9)$$

$$Cb = I_2 \left( \frac{2}{3} n_2^3 + n_2^2 + \frac{1}{3} n_2 \right) / f(2n_2 E_o - E_2) \quad (10)$$

According to the equations (9) and (10) thus far described, the capacitances of the capacitors constituting the step-up rectifier circuit are set according to the magnitudes of output currents and voltages relating to such capacitors, frequency of input power supply, the secondary voltage of the transformer and the number of voltage-multiplication steps in the sections relating to those currents. As a result, if the capacitance of each capacitor is determined on the basis of equations (9) and (10), the output voltages and currents at individual output terminals can be made constant, regardless of the load conditions.

Another embodiment of the present invention will be described in FIG. 3, where components identical to those in FIG. 1 are indicated by the same reference characters.

Figure 3:
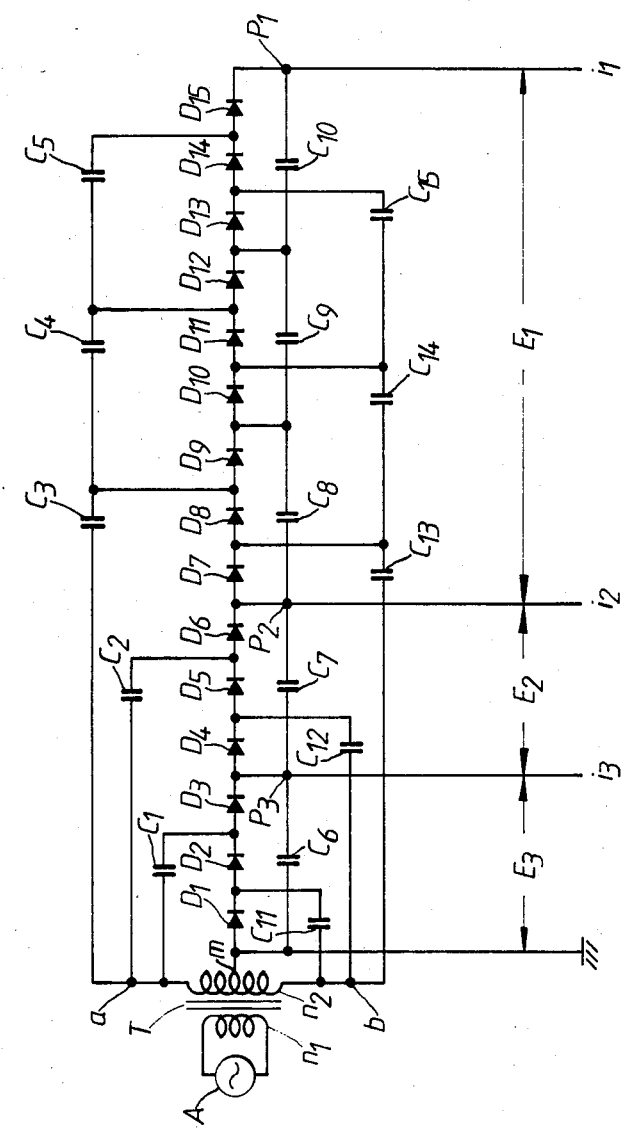
FIG. 3 is a circuit diagram of another embodiment of the step-up rectifier circuit constructed according to the present invention.

As shown in FIG. 3, one terminal of each of capacitors $C_1$ and $C_2$ is connected to the node between diodes $D_2$ and $D_3$ and the node between diodes $D_5$ and $D_6$, respectively, and the other terminals thereof are connected to terminal a of the secondary winding $n_2$ of the transformer T. One terminal of each of capacitors $C_{11}$ and $C_{12}$ is connected to the node between diodes $D_1$ and $D_2$ and the node between diodes $D_4$ and $D_5$, respectively, and the other terminals thereof are connected to the other terminal b of the secondary winding $n_2$ of the transformer T. An output which has a voltage to ground of $E_3$ (V) and a current $i_3$ (A) is obtained from a node $P_3$ (which will be referred to as the "output terminal $P_3$") between capacitors $C_6$ and $C_7$. The remainder of the circuit of FIG. 3 is constructed in the same manner as the corresponding components shown in FIG. 1.

With this structure the output terminals $P_1$ and $P_2$ can be handled in exactly the same way as in the foregoing embodiment of FIG. 1, and similar operations may be conducted for output terminals $P_2$ and $P_3$ by substituting $(i_1 + i_2)$ and $(i_1 + i_2 + i_3)$ for $I_1$ and $I_2$, respectively, in formulas (9) and (10). Effects similar to those of the foregoing embodiment can be obtained by these substitutions.

By using this concept, moreover, the individual output voltages from a circuit with three or more output terminals can be stabilized.

In the embodiments thus far described, the description has concerned the case in which the secondary winding of a transformer provided with a tap is used as first to third input terminals to which an AC voltage is applied. The present invention can also be exemplified by a structure in which the first to third input terminals are connected to an AC power supply directly, i.e., not through a transformer.

What is claimed is:

1. A step-up rectifier circuit for multiplying input voltage applied to said circuit comprising first and second input terminals for supplying AC inputs of opposite polarities; a third input terminal connected between said first and second input terminals; rectifier means provided with a plurality of rectifying elements connected in series with said third input terminal and aligned in the same direction of rectification, a plurality of series-connected output capacitors, having one end connected to said third input terminal, and connected in parallel to said plurality of rectifying elements; a first output terminal connected to the other end of said series-connected output capacitors; a second output terminal connected to a node between said output capacitors; at least one additional output terminal connected to a node between said output capacitors which are located between said second output terminal and said third input terminal, a plurality of first capacitors connected between said first and second input terminals and nodes formed between those rectifying elements located between said first output terminal and said second output terminal; a plurality of second capacitors connected between said first and second input terminals and nodes formed between those rectifying elements located between said second output terminal and said additional output terminal; and a plurality of additional capacitors connected between said first and second input terminals and nodes formed between those rectifying elements located between said additional output terminal and said third input terminal; wherein each capacitance Ca in farads of said first capacitors and each capacitance Cb in farads of said second capacitors are defined by the following equations:

$$Ca = I_1(\tfrac{2}{3}n_1^3 + n_1^2 + \tfrac{1}{3}n_1)/f(2n_1E_o - E_1)$$

$$Cb = I_2(\tfrac{2}{3}n_2^3 + n_2^2 + \tfrac{1}{3}n_2)/f(2n_2E_o - E_2)$$

in which $I_1$ designates the current in amperes flowing through the first output terminal; n designates one-half of the number of said first capacitors; f designates the frequency in Hertz of the power supply; $E_o$ designates the voltage in volts between said first and second input terminals; $E_1$ designates output voltage in volts between first and second output terminals; $I_2$ designates the current in amperes flowing through the second output terminal; $n_2$ designates one-half of the number of said second capacitors; $E_2$ designates output voltage in volts between said second output terminal and said additional output terminal.

2. The step-up rectifier circuit as defined in claim 1 wherein said first and second input terminals for applying AC outputs of opposite polarities are first and second terminals of a secondary winding of a transformer.

* * * * *